United States Patent
Fendt

(10) Patent No.: US 9,815,480 B2
(45) Date of Patent: Nov. 14, 2017

(54) METHOD AND DEVICE FOR MONITORING THE FUNCTION OF A DRIVER ASSISTANCE SYSTEM

(71) Applicant: Conti Temic microelectronic GmbH, Nuremberg (DE)

(72) Inventor: Guenter Anton Fendt, Schrobenhausen (DE)

(73) Assignee: Conti Temic micrelectronic GmbH, Nuremberg ( * ) Notice: Subject to any disclaimer, the term of this patent is extended or adjusted under 35 U.S.C. 154(b) by 0 days.

(21) Appl. No.: 15/021,523

(22) PCT Filed: Sep. 26, 2014

(86) PCT No.: PCT/DE2014/200510
§ 371 (c)(1),
(2) Date: Mar. 11, 2016

(87) PCT Pub. No.: WO2015/048968
PCT Pub. Date: Apr. 9, 2015

(65) Prior Publication Data
US 2016/0221584 A1 Aug. 4, 2016

(30) Foreign Application Priority Data
Oct. 2, 2013 (DE) .......................... 10 2013 220 016

(51) Int. Cl.
*B60W 50/04* (2006.01)
*B60W 50/02* (2012.01)
*B60W 50/00* (2006.01)

(52) U.S. Cl.
CPC ........ *B60W 50/04* (2013.01); *B60W 50/0205* (2013.01); *B60W 2050/0083* (2013.01);
(Continued)

(58) Field of Classification Search
CPC .............. B60W 50/04; B60W 50/025; B60W 2050/0083; B60W 2050/0089; B60W 2050/0215; B60W 2550/10
See application file for complete search history.

(56) References Cited

U.S. PATENT DOCUMENTS

| | | | |
|---|---|---|---|
| 6,778,928 B2 | 8/2004 | Stiller | |
| 2002/0072869 A1* | 6/2002 | Stiller | ................... G01C 21/26 702/90 |
| 2013/0218398 A1 | 8/2013 | Gandhi et al. | |

FOREIGN PATENT DOCUMENTS

| | | |
|---|---|---|
| DE | 199 62 997 | 6/2001 |
| DE | 102 18 228 | 11/2003 |

(Continued)

OTHER PUBLICATIONS

International Search Report of the International Searching Authority for International Application PCT/DE2014/200510, dated Feb. 26, 2015, 2 pages, European Patent Office, HV Rijswijk, Netherlands.
(Continued)

*Primary Examiner* — Richard Camby
(74) *Attorney, Agent, or Firm* — W. F. Fasse

(57) ABSTRACT

For monitoring the function of a driver assistance system, the environment of a vehicle is detected by at least one sensor, sensor data of the environment is generated, and at least one measurement variable is determined from the sensor data and is compared to reference values for the measurement variable to monitor the function of the driver assistance system. The result of the function monitoring is subsequently output and/or stored in accordance with the result of the comparison.

18 Claims, 3 Drawing Sheets

(52) U.S. Cl.
CPC ............ *B60W 2050/0089* (2013.01); *B60W 2050/0215* (2013.01); *B60W 2550/10* (2013.01)

(56) References Cited

FOREIGN PATENT DOCUMENTS

| | | |
|---|---|---|
| DE | 102 46 066 | 4/2004 |
| DE | 102008045618 | 3/2010 |
| GB | 2 396 005 | 6/2004 |

OTHER PUBLICATIONS

PCT International Preliminary Report on Patentability including English Translation of PCT Written Opinion of the International Searching Authority for International Application PCT/DE2014/200510, dated Apr. 12, 2016, 9 pages, International Bureau of WIPO, Geneva, Switzerland.

German Search Report for German Patent Application No. 10 2013 220 016.1, dated Sep. 17, 2014, 8 pages, Muenchen, Germany, with partial English translation, 6 pages.

* cited by examiner

METHOD AND DEVICE FOR MONITORING THE FUNCTION OF A DRIVER ASSISTANCE SYSTEM

FIELD OF THE INVENTION

The invention relates to a method and device for monitoring the function of a driver assistance system, and a driver assistance system.

BACKGROUND INFORMATION

Driver assistance systems are basically known from the state of the art. Sensor based driver assistance systems are increasingly found in vehicles to detect traffic situations in the immediate environment of the vehicle. For this, various types of sensors can be used, such as for example optical sensors, which can be embodied e.g. as optical cameras, night vision systems or image intensifier systems, infrared cameras or thermal imaging cameras. In principle, however, the sensors can also be designed to receive electromagnetic radiation of other wavelengths such as e.g. radar, lidar or to receive sound waves such as e.g. ultrasound.

If traffic situations must be detected also spatially, so-called "stereo systems" are applied, which use at least two sensors, which detect the environment of the vehicle from different positions, thus enabling determination of spatial information. Here, for example, optical sensors such as stereo cameras can be used, but even these stereo systems can be designed to receive electromagnetic radiation of other wavelengths such as e.g. radar, lidar or to receive sound waves such as e.g. ultrasound.

For an error-free functionality of stereo systems e.g. while using stereo cameras it is necessary that the adjustment of the individual sensors (for example from two individual cameras/camera modules) to each other is effected very accurately, and that this adjustment over the entire lifetime or operating time of the stereo system is maintained. This lifetime can well be a period of about 15 years. If, for example due to a defective or poorly performed production (e.g. defective assembly compounds, degradation of optical properties, optical detuning of a camera system), there is an —even minor—modification over the lifetime, this can lead to a malfunction or faulty measurement of the assembly and thus to faulty results, wherein said malfunction (if there is no total failure) can first of all remain undetected for the vehicle user in daily vehicle use.

SUMMARY OF THE INVENTION

In view of the above, it is an object of at least one embodiment of the present invention to propose an improved method and an improved device for monitoring the function of a driver assistance system.

An embodiment of the present invention relates to a method for monitoring the function of a driver assistance system, comprising the steps:
- detecting the environment of a vehicle by means of at least one sensor,
- generating sensor data of the environment of the vehicle,
- determination of at least one measurement variable from the generated sensor data,
- comparison of the at least one measurement variable to reference values for said measurement variable and
- output and/or storage of a result of the function monitoring in accordance with the result of the comparison.

Consequently, there is finally a validation of a known size, in particular a validation of a size known already before or during the function monitoring. Thus no complex, additional testing facilities or simulation methods are necessary, rather the function monitoring of a driver assistance system can be performed in the normal vehicle and sensor operation on the basis of determined measurement variables of the environment of the vehicle. The reference values can be available already in stored form and/or can be provided parallel for the determination of the measurement variables for example via data retrieval, so that with low time and low processing effort—in particular in real time—a function monitoring of a driver assistance system can be performed.

It can be provided here that for performing and/or improving the determination of a first measurement variable at least one second measurement variable is used, which is determined on the basis of sensor data of at least one further sensor. The at least one further sensor can be embodied as already explained above as any type of appropriate sensor, in particular as an optical sensor e.g. as an optical camera, night vision system or image intensifier system, infrared camera or thermal imaging camera. Basically, however, the at least one further sensor can also be designed to receive electromagnetic radiation of other wavelengths such as e.g. radar, lidar or to receive sound waves such e.g. ultrasound. Further, the at least one further sensor can also be embodied as a sensor for determining tracing and positioning data, clearance data, distance data, route data, time data, speed data, position data or data on relative distances.

It can be provided that the spatial expansion of objects is determined as a measurement variable. For example, the spatial expansion (length, width, height) of vehicles can be determined as a measurement variable. But also the spatial expansion (length, width, height) of stationary objects such as streets, buildings, traffic signs or road boundary posts can be determined.

Alternatively or additionally it can be provided that the spatial relative distance to objects is determined as a measurement variable. For example, the spatial relative distance to vehicles in the environment can be determined as a measurement variable. But also the spatial relative distance to stationary objects such as buildings, bridge piers, traffic signs or road boundary posts can be determined.

Alternatively or additionally it can be provided that the spatial distance between objects is determined as a measurement variable. For example, the spatial distance between stationary objects such as buildings, road boundary posts or road markings can be determined.

Here, it can be provided each that a one-time, self-contained measurement for determining the measurement variable is performed and that thus the measurement variable—possibly within a sufficient accuracy—is already used for a comparison to reference values.

Alternatively it can be provided that temporally successive measurements for determining the measurement variable are performed. Said measurements can be performed either cyclically or at regular intervals, wherein, however, at a particular time each a one-time, self-contained measurement for determining the measurement variable is performed. However, it can also be provided that only by multiple temporally successive measurements time-dependent sensor data are generated at different points in time and that the determination of the measurement variable is performed by combining the plurality of sensor data of different points in time.

Further, it can be provided that within determination of the measurement variable historical and/or stored reference values for said measurement variable are used. These reference values can be, for example, values of the spatial expansion (length, width, height) of vehicles, as they can be available in vehicle databases—via a wireless data connection online (i.e. via data retrieval) or in the vehicle itself stored in a storage means. However, also values of the spatial expansion (length, width, height) of stationary objects such as streets, buildings, traffic signs, road boundary posts can be used as reference values or the spatial distance between stationary objects such as buildings, road boundary posts or road markings, as they can be available in road maps, satellite maps data, street view data or as data on traffic signs and transport facilities—via a wireless data connection online (i.e. via data retrieval) or in the vehicle itself stored in a storage means. The stored reference values can be available pre-stored or they can be collected as historical data during operation of the vehicle (or by other vehicles, which feed these data into a common database) by sensor measurements and corresponding determination of measurement variables and by subsequently storing the determined measurement variables and within a function monitoring of a driver assistance system then these historical data can be used as reference values.

A further embodiment of the present invention relates to a device for monitoring the function of a driver assistance system, comprising:
- at least one sensor for detecting the environment of a vehicle,
- a determination means designed to generate sensor data of the environment of the vehicle and to determine at least one measurement variable from the generated sensor data,
- a comparison means designed to compare the at least one measurement variable to reference values for said measurement variable and
- an output and/or storage means for outputting and/or storing a result of the function monitoring in accordance with the result of the comparison.

The at least one sensor can be embodied as already explained above as any type of appropriate sensor, in particular as an optical sensor e.g. as an optical camera, night vision system or image intensifier system, infrared camera or thermal imaging camera. Basically, however, the sensor can also be designed to receive electromagnetic radiation of other wavelengths such as e.g. radar, lidar or to receive sound waves such as e.g. ultrasound. Further, also in this embodiment of the invention the sensor can be embodied as a sensor for determining tracing and positioning data, clearance data, distance data, route data, time data, speed data, position data or data on relative distances.

The device can comprise a data connection to a data storage, which contains data on historical and/or stored reference values of the determined measurement variable in machine-readable form. This data connection can be embodied as a line-connected connection, in particular as an electrical or optical cable connection, however, it can also be embodied as a wireless connection, for example as a radio connection or a wireless optical connection.

A further embodiment of the invention relates to a driver assistance system with a device according to the invention and as described herein.

BRIEF DESCRIPTION OF THE DRAWINGS

Further advantages and fields of application of the present invention will become apparent from the ensuing description in conjunction with the examples of embodiment shown in the drawings.

In the description, the claims, the abstract and the drawings the terms used in the below list of reference numerals and associated reference numerals are used.

The drawings show, in

Figure 1:
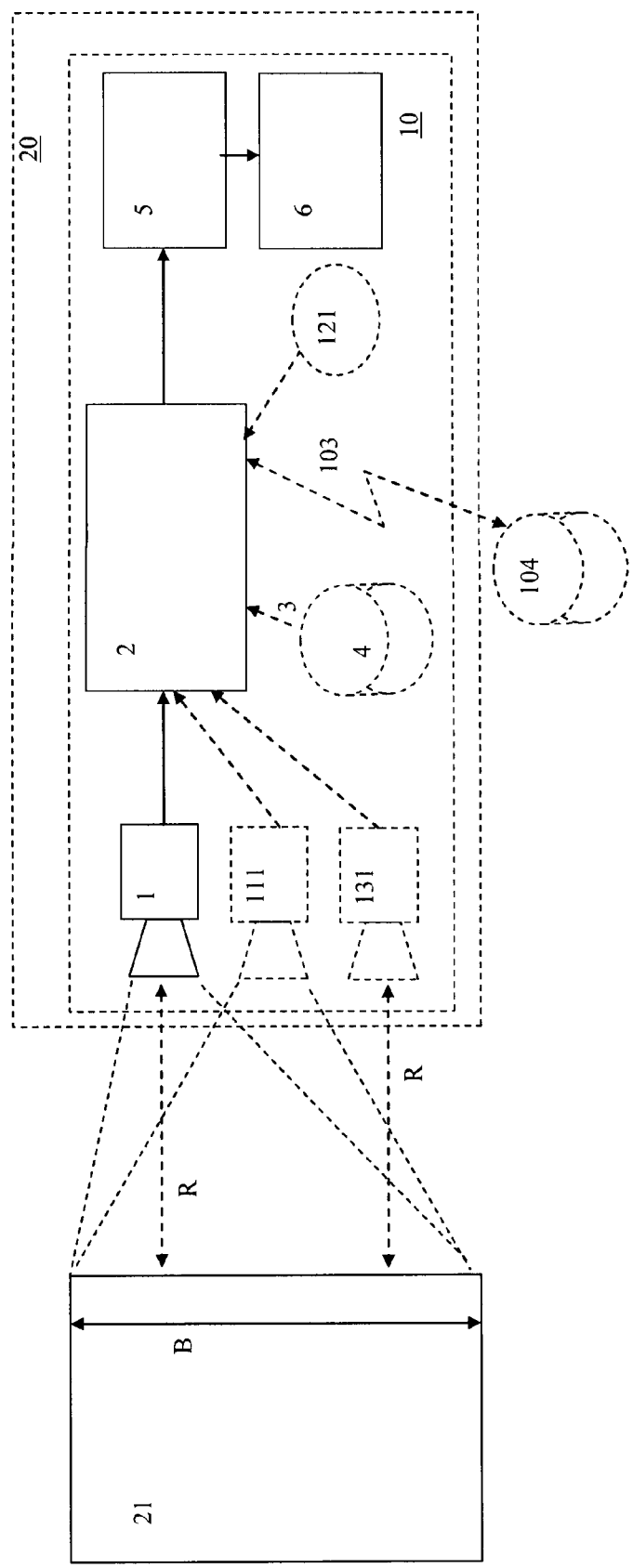
Figure 2:
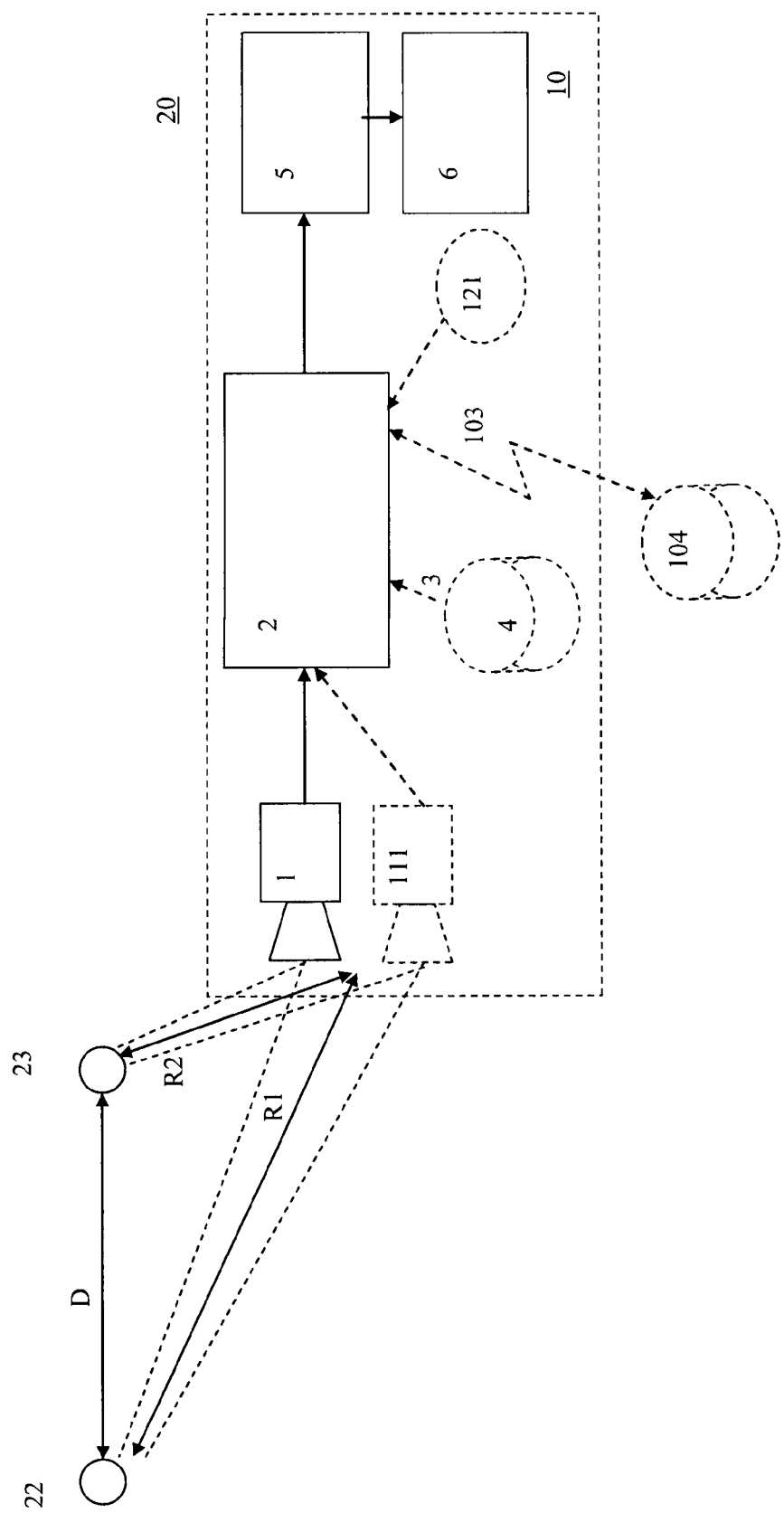
Figure 3:
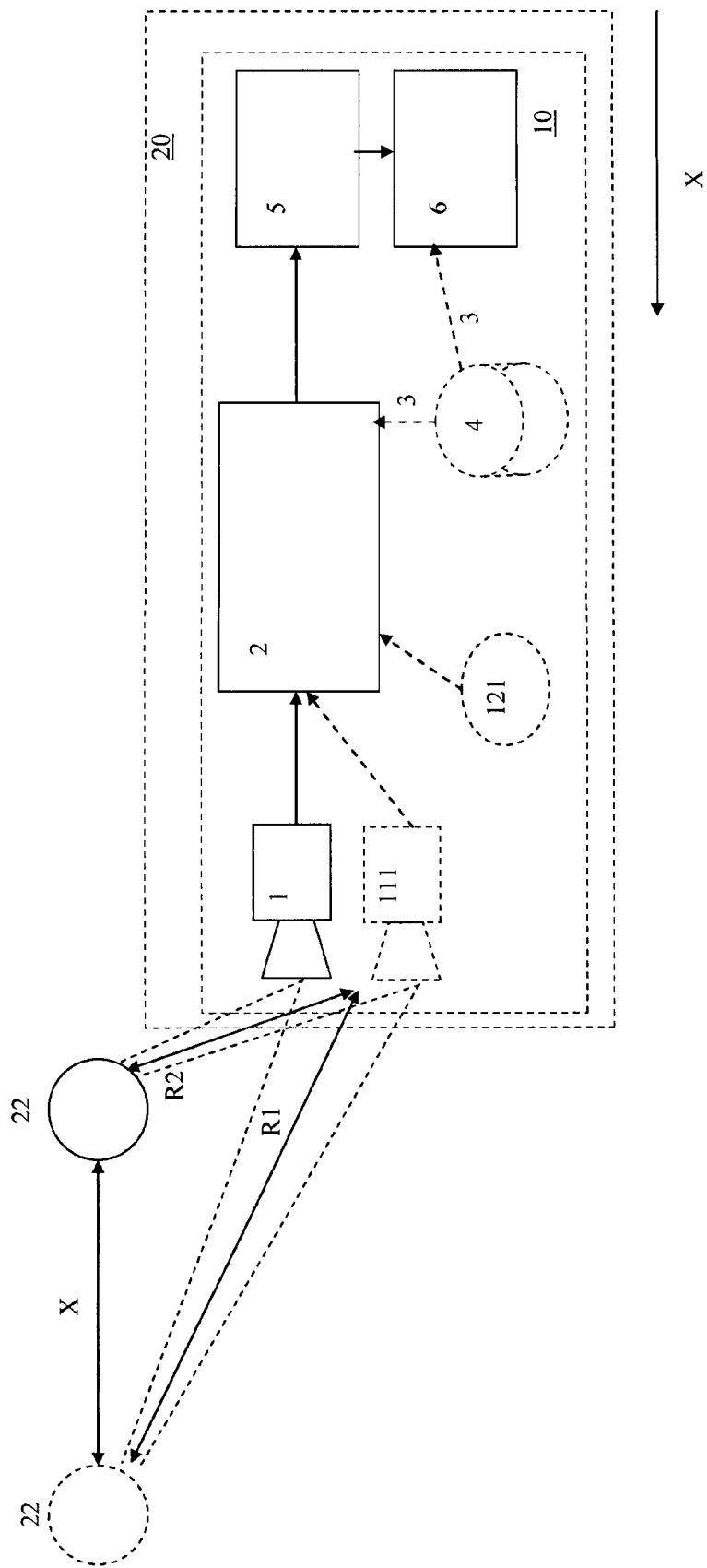

FIG. 1 a schematic representation of the function monitoring of a driver assistance system by determining the spatial expansion of an object FIG. 2 a schematic representation of the function monitoring of a driver assistance system by determining the spatial distance between objects FIG. 3 a schematic representation of the function monitoring of a driver assistance system by temporally successive determinations of the spatial relative distance to an object.

DETAILED DESCRIPTION OF EXAMPLE EMBODIMENTS OF THE INVENTION

In the following description identical, functionally identical and functionally related elements can be provided with the same reference numerals. Absolute values are shown in the following only by way of example and are not to be construed as limiting the invention.

FIG. 1 schematically shows the function monitoring of a driver assistance system by determining the spatial expansion of an object 21, wherein FIG. 1 schematically shows a corresponding device 10 in a vehicle 20 and the corresponding method steps for monitoring the function of a driver assistance system. With the aid of a first sensor 1 and—in case of a stereo sensor system additionally also with the aid of a second sensor 111—the environment of a vehicle 20 is detected. Sensor data of the environment of the vehicle 20 are generated and at least one measurement variable B, R is determined from the generated sensor data, namely with the aid of a determination means 2 designed to generate sensor data of the environment of the vehicle 20 and to determine at least one measurement variable B, R from the generated sensor data.

The determination means 2 is connected for data transmission to a comparison means 5, which is designed to compare the at least one measurement variable B, R to reference values for said measurement variable B, R. The comparison means 5 is finally connected to an output and/or storage means 6, which is designed to output and/or store a result of the function monitoring in accordance with the result of the comparison. Consequently, the comparison means 5 performs a comparison of the at least one measurement variable B, R to reference values for said measurement variable B, R, and the output and/or storage means 6 outputs and/or stores a result of the function monitoring in accordance with the result of the comparison.

In the example embodiment according to FIG. 1 the spatial expansion or expanse (e.g. dimension) B of an object 21 is determined as the first measurement variable, for example the width of another vehicle. However, also the spatial expansion B (length, width, height) of a stationary object 21 can be determined, for example of a street, a building, a road sign or a road boundary post. The spatial expansion B can be determined by geometrical methods (e.g. trigonometry).

To perform and/or to improve the determination of the first measurement variable B, i.e. the spatial expansion of an object 21, the spatial relative distance R to the object 21 can be determined as a further, second measurement variable, i.e. the distance to the object 21 at the point in time of the measurement of the spatial expansion B. As a result, at the point in time of the measurement of the spatial expansion B simultaneously the spatial relative distance R from the vehicle 20 to the object 21 is known. This is done in the example of embodiment according to FIG. 1 on the basis of sensor data of at least one further sensor 1, 111, 131. This at least one further sensor 1, 111, 131 can be one of two anyway existing sensors 1, 111 of a stereo sensor system, but also in addition to two sensors 1, 111 of a stereo sensor system a further, additional sensor 131 for determining the spatial relative distance R to the object 21 can be provided.

For a further improvement of the determination of the first measurement variable B or of the determination of other operating parameters of the vehicle 20 also further sensors 121 can be provided, for example for determining tracing and positioning data, clearance data, distance data, route data, time data, speed data or position data.

The determination means 2 is connected via a data connection 3, 103 to a data storage 4, 104, which contains data on historical and/or stored reference values of the measurement variable B, R in machine-readable form and from which said historical and/or stored reference values of the measurement variable B, R can be retrieved by the determination means 2. Thus, in the context of the function monitoring of a driver assistance system parallel to the determination of the measurement variable B, R reference values of said measurement variable in the form of historical and/or stored reference values can be used for a comparison of the determined measurement variable B, R to the reference values for said measurement variable B, R. In the example of embodiment according to FIG. 1 these historical and/or stored reference values are reference values of the measurement variable B, i.e. of the spatial expansion of an object 21. These reference values B can be, for example, historical and/or stored values of the spatial expansion (length, width, height) of vehicles, as they can be available in vehicle databases. However, also historical and/or stored values of the spatial expansion (length, width, height) of stationary objects such as buildings, traffic signs, road boundary posts can be used as reference values B. Historical reference values are here e.g. values, which have been collected with the aid of the sensors 1, 111 during the operating period of the vehicle 20 by a series of measurements—possibly compared to data for detecting vehicle types. Before taking the vehicle into operation stored values can be transmitted to the vehicle 20 during maintenance or also via a data connection 103 and can be stored or pre-stored in a data storage 4, so that before a first operation or before a renewed operation of the vehicle 20 they are already available stored in the data storage 4.

The data connection 3, 103 can be embodied as a line-connected data connection 3, in particular as an electrical or optical cable connection. However, it can also be embodied as a wireless data connection 103, for example as a radio connection or a wireless optical connection.

If the determined spatial expansion B (for example the width of a preceding vehicle) conforms to the historical and/or stored reference values deposited in the data storage 4, 104 for said spatial expansion B (for example with vehicle target widths), it can be assumed that the driver assistance system 10 is working correctly. If the determined spatial expansion B (i.e. for example the width of a preceding vehicle) has a significant deviation from the historical and/or stored reference values for said spatial expansion B, this leads to the conclusion that there is a fault in the system. The result of this comparison can be determined with the aid of the comparison means 5 and can be output via the output and/or storage means 6 to the vehicle user and/or can be stored in a data storage. This function monitoring is particularly very effective, if the system is an optical stereo system and constant optical properties of the optical system such as e.g. constant lens parameters, focal length, etc. can be assumed.

FIG. 2 shows schematically an example of embodiment for a function monitoring of a driver assistance system by determining the spatial distance between objects 22, 23. As is shown in FIG. 1, also in FIG. 2 a corresponding device 10 is schematically shown in a vehicle 20 and the corresponding method steps for monitoring the function of a driver assistance system are schematically shown. With the aid of a first sensor 1 and—in case of a stereo sensor system additionally also with the aid of a second sensor 111—the environment of a vehicle 20 is detected.

Now, sensor data of the environment of the vehicle 20 are generated and the measurement variables R1, R2 are determined, namely the spatial relative distances R1, R2 of the vehicle 20 to objects 22, 23, which are determined with the aid of a first sensor 1 and—in case of a stereo system—also with the aid of a second sensor 111. The measurement variables R1, R2 are determined from the generated sensor data, namely with the aid of a determination means 2. From the determined measurement variables R1, R2 then in the determination means 2 a further measurement variable D, namely the spatial distance D between the objects 22, 23 is determined. The measurement variable D can be determined by geometric methods (e.g. trigonometry).

The determination means 2 in turn is data connected to a comparison means 5, which is designed to compare the at least one measurement variable D to reference values for said measurement variable D. The comparison means 5 is finally connected to an output and/or storage means 6, which is designed to output and/or store a result of the function monitoring in accordance with the result of the comparison. Again, a comparison is performed of the at least one measurement variable D to reference values for said measurement variable D and an output and/or storage of a result of the function monitoring in accordance with the result of the comparison. Here, in turn the determination means 2 is connected via a data connection 3, 103 to a data storage 4, 104, which contains data on historical and/or stored reference values of the measurement variable D in machine-readable form and from which said historical and/or stored reference values of the measurement variable D can be retrieved by the determination means. 2. This data connection 3, 103 can also in this case be embodied as a line-connected data connection 3, in particular as an electrical or optical cable connection. However, it can also be embodied as a wireless data connection 103, for example as a radio connection or a wireless optical connection.

As a measurement variable D, the spatial distance between stationary objects 22, 23 such as buildings, road markings or road boundary posts can be determined and compared to reference values, as they can be available in road maps, satellite maps data, street view data or as data on traffic signs and transport facilities via a wireless data connection 3, 103 in a vehicle external data storage 104 or in the vehicle itself stored in a storage means 4. For this purpose, it is not necessary that objects 22, 23 such as road boundary posts are permanently present, as the system can chose whether to perform a measurement within a specific time interval (e.g. within 100 operating hours), if certain objects 22, 23 are recognized, which are suitable for performing a function monitoring.

The reference values can be available pre-stored, as already described above. However, they can also be collected as historical data during operation of the vehicle 20 (or by other vehicles, which feed these data into a common database) by sensor measurements and corresponding determination of measurement variables D and by storing the determined measurement variables D. Then within a function monitoring of the driver assistance system, then these historical and/or pre-stored data can be used as reference values.

Also in this example of embodiment for a further improvement of the determination of the measurement variable D or for determining other operating parameters of the vehicle 20 further sensors 121 can be provided, for example for determining tracing and positioning data, clearance data, distance data, route data, time data, speed data or position data.

If the determined spatial distances D of the stationary objects 22, 23 conform to the historical and/or stored reference values deposited in the data storage 4, 104 for said spatial distances D, it can be assumed that the driver assistance system 10 is working correctly. If the determined spatial distances D have a significant deviation from the historical and/or stored reference values for said spatial distances D, this leads to the conclusion that there is a fault in the system.

Now, FIG. 3 schematically shows an example of embodiment for monitoring the function of a driver assistance system by temporally successive determinations of the spatial relative distances R1, R2 to an object 22, determined with the aid of at least one sensor 1, 111. Here, the spatial relative distance R1, R2 to stationary objects such as buildings, bridge piers, traffic signs or road boundary posts can be determined. As already described on the basis of FIGS. 1 and 2 also here a corresponding device 10 is schematically shown in a vehicle 20 and the corresponding method steps for monitoring the function of a driver assistance system are schematically shown. With the aid of a first sensor 1 and—in case of a stereo sensor system additionally also with the aid of a second sensor 111—the environment of a vehicle 20 is detected.

Also in this case, sensor data of the environment of the vehicle 20 are generated and the measurement variables R1, R2 are determined, namely the spatial relative distances R1, R2 of the vehicle 20 to a stationary object 22, determined with the aid of a first sensor 1—and in case of a stereo system also with the aid of a second sensor 111—however, at different points in time, which is why at a first point in time this results in a spatial relative distance R1 and at a second, later point in time in a spatial relative distance R2 to the object 22. During that period the vehicle 20 has moved forward by a route X, i.e. the object X is closer by a route X to the vehicle relative to the vehicle 20 at the second, later point in time than at the first point in time. In case of a stereo system with a second sensor 111 the same applies to a measurement with the aid of two sensors 1, 111, i.e. also in this case this results at a first point in time in a spatial relative distance R1 and at a second, later point in time to a spatial relative distance R2 of the vehicle 20 to the object 22.

The determination of the measurement variables R1, R2 is performed from the detected sensor data, namely with the aid of a determination means 2. From the difference of the spatial relative distances R1, R2 the determination means 2 can determine the route X by geometrical methods (e.g. trigonometry). Here, also a classical structure-from-motion approach can be used, wherein with a known proper motion of the vehicle 20 the distance to the object 22 is determined from the image data, which the determination means generates from the sensor data of the sensor 1—and in case of a stereo system also of the sensor 111. For this purpose, in addition, data of other operating parameters of the vehicle 20 can be used, which are obtained with the aid of further sensors 121, for example with the aid of further sensors 121 for determining tracing and positioning data, clearance data, distance data, route data, time data, speed data or position data. Thus, with respect to stationary objects 22 during the motion of the vehicle the measurement variables R1, R2 can be determined as relative distances at different points in time. The measurement variable for the route X can then be determined from the relative distances R1, R2 between the vehicle 20 and the object 22 from the measurements made at different points in time. In parallel, a reference value for the route X is determined from the further operating parameters of the vehicle 20—for example from the determined speed and the determined time between the measurements. The determined value for the measurement variable X can then be compared to the determined reference value for the measurement variable X.

Additionally, also a further improvement of the measurement can be made by including further measurement variables of further sensors 121, for example of a position sensor for determining time-dependent position changes or of sensors for determining data of the wheel circumference and sensors for determining the number of revolutions of the wheels, so that from the temporal change of the position or from the time-dependent data on the distances of the wheel circumference traveled on the road also or in addition the speed and/or traveled route X can be determined.

The determination means 2 in turn is data connected to a comparison means 5, which is designed to compare the least one measurement variable X to the reference values determined with the aid of sensors 121 for said measurement variables X. The comparison means 5 is finally connected to an output and/or storage means 6, which is designed to output and/or store a result of the function monitoring in accordance with the result of the comparison. Again, the at least one measurement variable X is compared to reference values for said measurement variable and a result of the function monitoring is output and/or stored in accordance with the result of the comparison. The determination means 2 or the output and/or storage means 6 is connected via a data connection 3 to a data storage 4.

If the determined route X conforms to the reference value for said route X, it can be assumed that the driver assistance system 10 is working correctly. If the determined route X has a significant deviation from the reference value for said route X, this leads to the conclusion that there is a fault in the system.

REFERENCE NUMERALS 1 sensor
2 determination means
3 data connection
4 data storage
5 comparison means
6 output and/or storage means
10 driver assistance system
20 vehicle
21 object
22 object
23 object
111 sensor
121 sensor
131 sensor
B spatial expansion of objects
D spatial distance of objects
R spatial relative distance to objects R1 spatial relative distance to objects
R2 spatial relative distance to objects
X traveled distance

The invention claimed is:

1. A method of monitoring whether a driver assistance system is properly functional, comprising steps:
   detecting an environment of a vehicle by at least one sensor,
   generating sensor data regarding the environment of the vehicle,
   determining at least one measurement variable from the generated sensor data, wherein the at least one measurement variable comprises at least one of a spatial expanse of an object detected in the environment and a spatial distance between objects detected in the environment,
   comparing the at least one measurement variable to reference values for the at least one measurement variable, and producing a corresponding comparison result,
   based on and dependent on the comparison result, producing an indication of whether the driver assistance system is functioning properly, and
   outputting and/or storing the indication.

2. The method according to claim 1, further comprising providing additional sensor data of at least one additional sensor, and wherein the determining of the at least one measurement variable comprises determining at least one second measurement variable from the additional sensor data, and determining or improving a first measurement variable based on the at least one second measurement variable.

3. The method according to claim 1, wherein the at least one measurement variable comprises the spatial expanse of the object detected in the environment of the vehicle.

4. The method according to claim 1, wherein the at least one measurement variable further comprises a spatial relative distance between the vehicle and an object detected in the environment of the vehicle.

5. The method according to claim 1, wherein the at least one measurement variable comprises the spatial distance between the objects detected in the environment of the vehicle.

6. A method of monitoring whether a driver assistance system is properly functional, comprising steps:
   detecting an environment of a vehicle by at least one sensor,
   generating sensor data regarding the environment of the vehicle,
   determining at least one measurement variable from the generated sensor data, wherein the determining of the at least one measurement variable comprises a one-time measurement of a variable in the generated sensor data,
   comparing the at least one measurement variable to reference values for the at least one measurement variable, and producing a corresponding comparison result,
   based on and dependent on the comparison result, producing an indication of whether the driver assistance system is functioning properly, and
   outputting and/or storing the indication.

7. The method according to claim 1, wherein the determining of the at least one measurement variable comprises plural temporally successive measurements of a variable in the generated sensor data.

8. The method according to claim 1, wherein the reference values comprise historical and/or stored reference values for the measurement variable.

9. The method according to claim 1, further comprising providing historical and/or stored reference values, and wherein the determining of the at least one measurement variable comprises using the historical and/or stored reference values for the measurement variable.

10. A device for monitoring whether a driver assistance system is properly functional, comprising:
    at least one sensor for detecting an environment of a vehicle,
    a determination means configured and arranged to generate sensor data of the environment of the vehicle and to determine at least one measurement variable from the generated sensor data, wherein the at least one measurement variable comprises at least one of a spatial expanse of an object detected in the environment and a spatial distance between objects detected in the environment,
    a comparison means configured and arranged to compare the at least one measurement variable to reference values for the at least one measurement variable and to produce a corresponding comparison result, and
    an output and/or storage means configured and arranged to output and/or store an indication of whether the driver assistance system is functioning properly based on and dependent on the comparison result.

11. The device according to claim 10, further comprising a data connection to a data storage memory that contains data on historical and/or stored reference values of the determined measurement variable in a machine-readable form.

12. A combination comprising a driver assistance system and the device according to claim 10.

13. The device according to claim 10, wherein the at least one measurement variable comprises the spatial expanse of the object detected in the environment of the vehicle.

14. The device according to claim 10, wherein the at least one measurement variable comprises the spatial distance between the objects detected in the environment of the vehicle.

15. The method according to claim 6, wherein the at least one measurement variable comprises a spatial expanse of an object detected in the environment of the vehicle.

16. The method according to claim 6, wherein the at least one measurement variable comprises a spatial relative distance between the vehicle and an object detected in the environment of the vehicle.

17. The method according to claim 6, wherein the at least one measurement variable comprises a spatial distance between objects detected in the environment of the vehicle.

18. The method according to claim 6, wherein the reference values comprise historical and/or stored reference values for the measurement variable.

* * * * *